E. Stangeland.
Agricultural Boiler.
N° 44,985. Patented Nov. 8, 1864.
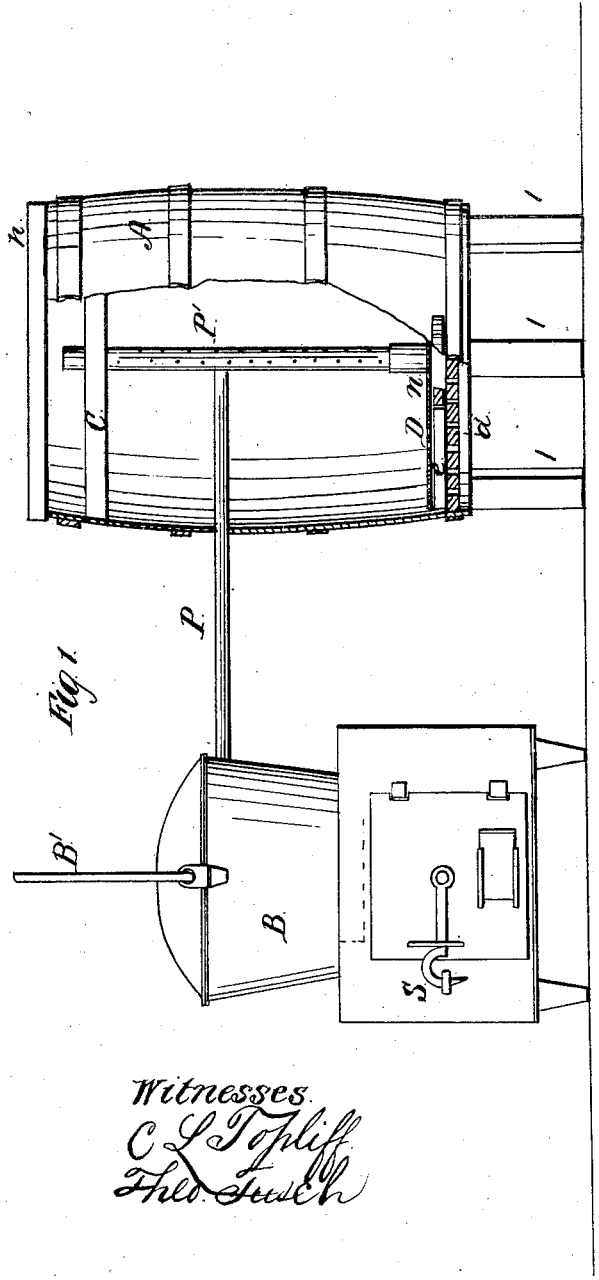
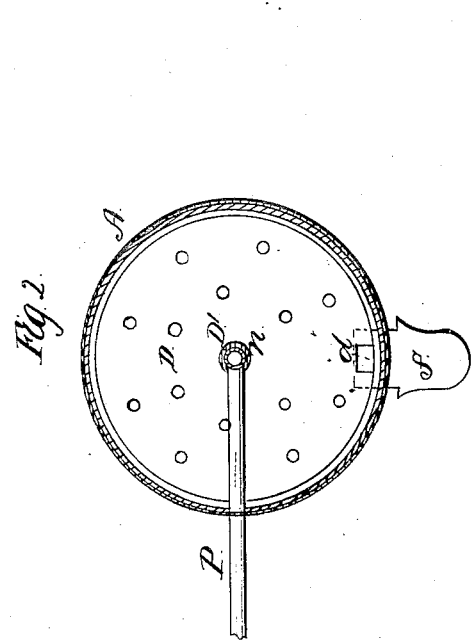
Witnesses
C L Topliff
Theo. Tusch
Inventor:
E Stangeland
per Munn & Co
Attys

UNITED STATES PATENT OFFICE.

ELIAS STANGELAND, OF ROCHESTER, MINNESOTA.

VEGETABLE-STEAMER.

Specification forming part of Letters Patent No. 44,985, dated November 8, 1864.

*To all whom it may concern:*

Be it known that I, ELIAS STANGELAND, of Rochester, in the county of Olmsted and State of Minnesota, have invented a new and useful Improvement in Apparatus for Steaming Food for Cattle; and I do hereby declare that the following is a full, clear, and exact description thereof, which will enable others skilled in the art to make and use the same, reference being had to the accompanying drawings, making a part of this specification, in which—

Figure 1 represents my apparatus in elevation, a portion of the outside of the barrel being broken away to show the parts within. Fig. 2 is a sectional view of the barrel, taken on a horizontal line above the steam-pipe P.

Similar letters of reference indicate like parts.

The object of my invention is to construct an apparatus for cooking food for cattle by steam which can be used for many different substances and can be made at a small cost.

It is well-known that when roots, grain, and other articles of food for cattle and stock are boiled or cooked their nutritious qualities are not so liable to be wasted or lost either in feeding or in digesting, and much that would be rejected in its raw state by the animal will be eaten when thus prepared. The economy of this mode of preparing food is now universally admitted by every agriculturist who has tried it by experiments or who has given any attention to the subject, yet the practice of preparing food for stock in this way has not been generally adopted, chiefly because the apparatus for carrying it out has subjected the farmer of small means, or whose stock is not numerous, to an expense, perhaps, disproportionate to the advantages likely to follow from its use.

My design in this invention is to do away with this objection, and my invention consists of improvements which are intended to facilitate the work and cheapen the cost of the apparatus.

S represents a stove or furnace of any kind upon which a boiler, B, of any construction and of suitable size, may be set. The bail B' of the boiler should be strong enough to enable it to be used as a means for holding down the cover of the boiler when it is necessary to prevent the escape of the steam through the joints of the cover. A steam-pipe, P, leads forth from the upper or steam-space in the boiler and is carried through the side of a barrel or steamer, which may be of wood for some uses or of any other material that is suitable and convenient. The steamer is to stand upon supports 1, and is fitted with a suitable cover which must be capable of being secured in its face against the pressure of the steam. The bottom of the steamer is to be perforated with minute holes, as seen in Fig. 1, which shows the bottom partly in section, and a square opening, $d$, is made through it near the side to which is fitted a slide, $f$, which extends through a slot in the side of the barrel, so that it can be moved from without. A grating, $e$, fits upon the perforated bottom to sustain a perforated metallic false bottom, D, which is rigidly secured to the lower part of a socket or short pipe, $n$. A perforated pipe, P', which is closed at top, but open at bottom, is inserted within the socket $n$, and is held at the top by a removable cross-piece, C, fitting loosely in the barrel, through which cross-piece C the pipe P' passes, as shown in the drawings. The steam-pipe P is joined to the pipe P' by a suitable joint. The joint made by the passage of the pipe P through the side of the barrel should be made tight.

The operation of my apparatus is as follows: When grain, such as oats, corn, and such other substances as lie compactly together are to be steamed, I prepare the steamer as shown in the drawings. Steam being then raised in the boiler it will pass through pipe P into the pipe P' and be forced out through its perforations (which are to be numerous and extend throughout its whole length) into the body of grain equally on all sides and at all intermediate points of its depth, thereby greatly expediting the process of saturation and cooking. The water of condensation from the pipe P' will collect in the socket $n$, and the water of condensation formed in the body of grain will pass off through the perforated false bottom D and the perforated bottom $a$. It is not of course intended to create a high pressure of steam in a steaming-vessel of this construction.

When I desire to steam larger articles—such as rutabagas, potatoes, apples, and other roots or fruits—I remove the steam-pipe P' and false bottom D and grating $e$, as the interstices between these articles are sufficient for the rapid and free circulation of the steam without a high pressure.

The object of the gate $d$ and slide $f$ is to enable me to cleanse the steamer of refuse after it has been used.

Having thus described my invention, I claim as new and desire to secure by Letters Patent—

A steamer for agricultural purposes constructed substantially as above described, containing a perforated pipe extending from its top to its bottom, a perforated false bottom, $d$, and perforated bottom $a$, and gate $d$, closed by a slide, $f$, or their several equivalents.

ELIAS STANGELAND.

Witnesses:
   A. NELSON,
   W. S. BOOTH.